Sept. 17, 1929.   W. R. UGGLA   1,728,844
RESILIENT DRIVING CONNECTION
Original Filed Jan. 30, 1924
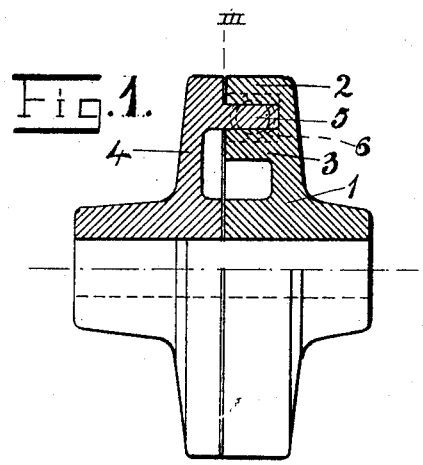
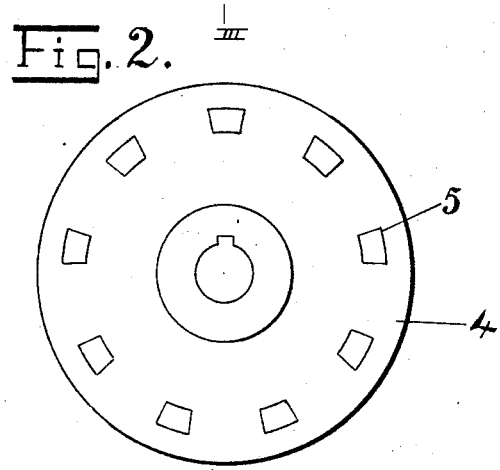
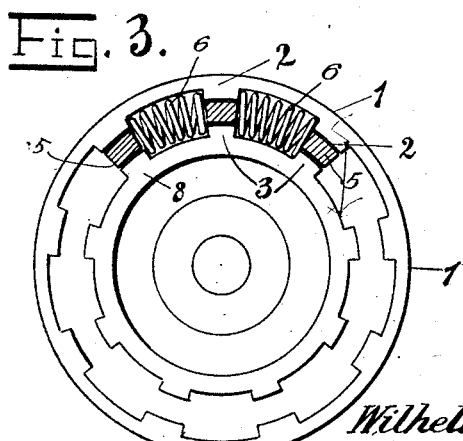
Inventor
Wilhelm Robert Uggla
By Mason Fenwick & Lawrence,
Attorneys Patented Sept. 17, 1929

1,728,844

UNITED STATES PATENT OFFICE

WILHELM ROBERT UGGLA, OF MORBY, SWEDEN

RESILIENT DRIVING CONNECTION

Original application filed January 30, 1924, Serial No. 689,577, and in Sweden February 1, 1923. Divided and this application filed November 9, 1925. Serial No. 67,953.

This invention relates to resilient driving connections, for instance shaft-couplings, of that type, which are provided with helical springs, located peripherically and co-operating with projections on the coupling members. According to the invention the said springs are located between sets of projections, which extend longitudinally of the axis of the coupling from those sides of the coupling members which face one another, said projections embracing each other like fork shanks. Owing to this arrangement the parts of the coupling may easily be assembled or the coupling taken asunder by the members being pushed laterally into and withdrawn from each other respectively.

In the accompanying drawing Fig. 1 shows in an elevation partly in a longitudinal section a resilient coupling arranged in accordance with this invention. Figure 2 is a side elevation of one of the coupling members. Figure 3 is a partly side elevation of the other coupling member and partly a section along the line III—III of Figure 1.

The coupling member 1 is provided with axial projections 2 and 3, located in pairs on the same radius of the member, while the other coupling member 4 is provided with single axial projections 5, which are so located and have such dimensions, that they will be located in the spaces respectively between two projections 2 and 3 of the coupling member 1, when the coupling members are pushed laterally into one another. The said projections 2, 3 and 5 may be made integral with the coupling-members respectively as shown. Between the sets of projections thus disposed helical springs 6 are provided, which are located peripherically and the ends of which bear against the sets. The spaces between the projections 2, 2 and 3, 3 of the coupling-member 1 are filled up by walls 7 and 8 concentric with the said member, so that the springs are located in chambers, covered by the member 4.

If the coupling-member 1 is the driving part, the projections 2 and 3 tend to move the springs 6 and compress the same to a certain degree, the projections 2 and 3 of each set being thus somewhat displaced with relation to the projections 5. During this operation the springs 6 acted upon by the projections 2 and 3 and bearing against the projections 5 of the coupling-member 4 cause the member last mentioned to rotate. Owing to the provision of the springs a resilient transmission of the motion free from jerks is effected, in which transmission all the springs partake. It is just the same when the coupling-member 1 is rotated in the opposite direction or if the coupling-member 4 constitutes the driving part. Owing to the fact that the springs 6 only bear against the projections 2, 3 and 5 and are not fixed to the same and operate through compression, it is sufficient to place the springs, having a certain initial tension, into the spaces between the sets of projections. The manufacture of the resilient coupling is thereby considerably facilitated. The parts of the coupling are easily assembled and the coupling taken asunder simply by sliding the coupling-members laterally with relation to each other. The length of the springs may by grinding be adjusted in such an exact manner, that all springs operate practically in the same degree for the transmission of the power between the coupling-members. The springs bear against the projections 2, 3 and 5 over their whole end, owing to which fact the springs are centrally loaded. The dimensions of the springs and the pitch of same may be so adapted, that if the coupling is overloaded, the springs are wholly compressed, without the strain on them being so great that they break. Consequently, when the coupling is overloaded, the springs constitute abutments between the coupling-members. If however, any of the springs or the projections should break, no pieces will come out from the coupling, because all parts are enclosed in perfectly closed chambers.

I claim:

In a resilient coupling the combination of two coupling members, projections extending axially from the one member and arranged in sets, located on radial lines and constituting recesses, helical springs located in the said recesses and bearing against the projections under unloaded condition, projections extending axially from the second member and into the spaces between the projections of the said sets respectively and occupying the entire space between the springs under the said unloaded condition, each spring thus operating in both directions.

In testimony thereof I have hereunto affixed my signature.

WILHELM ROBERT UGGLA.